United States Patent [19]

Saito

[11] Patent Number: 5,620,711
[45] Date of Patent: Apr. 15, 1997

[54] MOLD FOR FORMING A WATERPROOF CABLE

[75] Inventor: Takahiro Saito, Shizuoka-ken, Japan

[73] Assignee: Yazaki Corporation, Tokyo, Japan

[21] Appl. No.: 551,647

[22] Filed: Nov. 1, 1995

[30]    Foreign Application Priority Data

Nov. 4, 1994  [JP]  Japan .................................. 6-270953

[51] Int. Cl.$^6$ ........................... B29C 33/12; B29C 45/14
[52] U.S. Cl. ................ 425/116; 249/91; 249/93; 264/275; 425/117; 425/542
[58] Field of Search .................................. 425/116, 117, 425/542; 249/91, 93, 94, 95; 264/275

[56]             References Cited

U.S. PATENT DOCUMENTS

| | | | |
|---|---|---|---|
| 3,865,343 | 2/1975 | Jenkins | 249/95 |
| 4,336,009 | 6/1982 | Wolf | 425/116 |
| 4,405,083 | 9/1983 | Charlebois et al. | 249/95 |
| 4,519,567 | 5/1985 | Rauteberg | 249/91 |
| 4,769,198 | 9/1988 | Bechtold et al. | 249/91 |
| 5,182,032 | 1/1993 | Dickie et al. | 249/91 |
| 5,262,115 | 11/1993 | Tomlinson | 425/116 |
| 5,407,340 | 4/1995 | Paguet et al. | 425/116 |

FOREIGN PATENT DOCUMENTS

| | | |
|---|---|---|
| 64-6723 U | 1/1989 | Japan . |
| 6-150757 | 5/1994 | Japan . |
| 6-205528 | 7/1994 | Japan . |
| 6-233435 | 8/1994 | Japan . |

*Primary Examiner*—Khanh P. Nguyen
*Attorney, Agent, or Firm*—Wigman, Cohen, Leitner & Myers, P.C.

[57]             ABSTRACT

A mold for forming a waterproof cable has wire introducing openings 3a, 3b at both ends and a cavity 7 for loosely receiving a plurality of wires. Ridges 35a, 35b, which extend in such a transverse direction relative to a wire insertion direction, are arranged on an inner surface 7a of the inner space 7. Thereby, the mold for forming waterproof cables can provide an improved waterproof structure of the electric wire bundle.

8 Claims, 3 Drawing Sheets

MOLD FOR FORMING A WATERPROOF CABLE

BACKGROUND OF THE INVENTION

1. Field of the Invention

The present invention relates to a mold for forming waterproof cables, the mold being utilized for injecting a packing material among wires of an electric wire bundle to inhibit water.

2. Background of the Invention

A mold for forming waterproof cables disclosed, for example, in Japanese Utility Model Publication (KOKAI) 64-6723 is known as a conventional mold of this type. The mold for forming waterproof cables comprises upper and lower halves which mate with each other to form the mold. The lower half of the mold has first and second wire introducing openings at both ends thereof. In the lower half of the mold, a half part of a cavity is formed for loosely receiving a plurality of electric wires. The cavity is formed in a drum like shape and is enlarged at a substantially central portion along a wire inserting direction. The half part of the cavity has a corresponding shape. An injection port is also formed in the lower half of the mold.

After a plurality of electric wires, i.e. a wire bundle, is received loosely through the first and the second introducing openings, and a packing material for inhibiting water is supplied through the injection port, the packing material fills in spaces between the wires within the cavity defined by the lower and upper parts of the mold.

In the above waterproof structure, it is essential that the wires not be exposed from the packing material so as to achieve an improved waterproof function. In molding, however, when wires are received in the cavity, they come into contact with an inner surface of the lower half by the effect of gravity, etc. In such a case, it is anticipated that the packing material does not spread between the wires and the inner surface of the lower half and, therefore, the wires are exposed largely from the packing material when molding is completed.

SUMMARY OF THE INVENTION

Thus, it is an object of the present invention to provide a mold for forming waterproof cables, which mold has a simple design and can form a waterproof structure without a wire being exposed.

According to a first feature of the invention, a mold for forming waterproof cables, which is provided with wire introducing openings at both ends and a cavity for loosely receiving a plurality of electric wires, is characterized in that, at an inner wall surface of the cavity, a ridge which extends in a transverse direction relative to a wire insertion direction is provided.

According to a second feature of the invention, a mold for forming waterproof cables, as described above, is characterized in that the cavity has a drum like shape and is enlarged at a substantially central portion along the wire insertion direction, and in that the ridge is arranged at the substantially central portion of the cavity.

According to a third feature of the invention, a mold for forming waterproof cables, as described above, is characterized in that the ridge is arranged perpendicularly to the wire insertion direction.

According to a fourth feature of the invention, a mold for forming waterproof cables, as described above, is characterized in that two ridges are provided.

Thus, in functions of the present invention, according to the first feature of the invention, by means of the ridge arranged transversely to the insertion direction of the wires, a direct contact of the wires with the inner wall surface of the cavity can be prevented, and packing material can be spread sufficiently.

According to the second feature of the invention, in the cavity formed in the drum like shape and enlarged at a substantially central portion along the wire insertion direction, contact of the wires with the inner wall surface at the substantially central portion becomes extensive, but the ridge provided at the substantially central portion may prevent the wires from contacting with the inner wall surface.

According to the third feature of the invention, contact of the wires with the inner wall surface at the substantially central portion of the cavity can be prevented by means of the ridge provided perpendicularly to the wire insertion direction.

According to the fourth feature of the invention, contact of the wires with the inner wall surface can be surely prevented at the substantially central portion of the cavity by means of the two ridges.

As is clear from the above, according to the first feature of the invention, the wires inserted into the cavity do not form a large contact with the inner surface of the cavity by means of the ridges extending perpendicularly to the wire insertion direction, so that the packing material may be spread sufficiently. Therefore, projection of the wires from the hardened packing material can be prevented, and reliability of the waterproof structure can be significantly improved.

According to the second feature of the invention, a large contact area is not established between the wires and the inner wall surface at the substantially central portion by the ridges arranged on the substantially central portion of the drum like shaped cavity, so that the packing material can be spread sufficiently. Accordingly, reliability of the waterproof structure can be significantly improved.

According to the third feature of the invention, it is possible with certainty to prevent the wires from contacting the inner surface of the cavity at the substantially central portion thereof by the ridges arranged perpendicularly to the wire insertion direction, so that the packing material can be spread sufficiently at the substantially central portion of the cavity.

According to the fourth feature of the invention, it is possible to prevent the wires from contacting the inner surface of the cavity at the central portion thereof by the two ridges, so that the packing material can be spread sufficiently.

DETAILED DESCRIPTION OF THE PREFERRED EMBODIMENT

Now, referring to FIGS. 1 to 5, some embodiments of the present invention will be described hereinafter.

Figure 1:
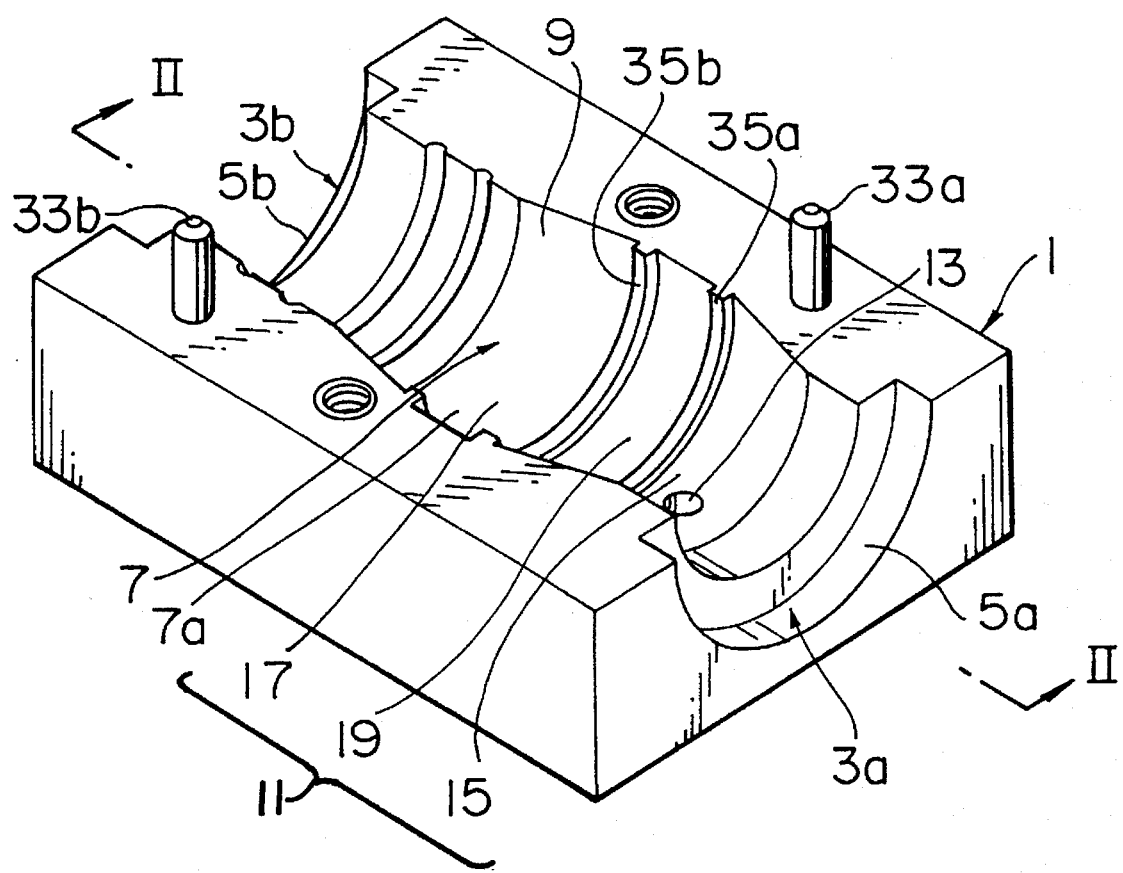
FIG. 1 is a perspective view of the lower half of the mold for forming waterproof cables according to an embodiment of the present invention.
Figure 2:
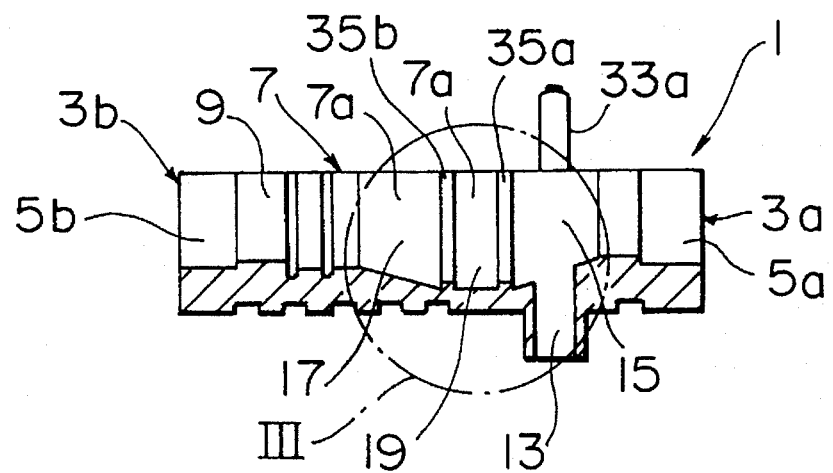
FIG. 2 is a sectional view along a line II—II of FIG. 1.

FIG. 1 is a perspective view of a mold for forming waterproof cables, and FIG. 2 is a sectional view along a line II—II of FIG. 1. The mold comprises an upper half (not shown) and a lower half 1 shown in FIG. 1. These upper and lower halves compose the mold for forming waterproof cables, when they mate with each other. Therefore, the mold has an upper part (not shown) which is substantially symmetrical to the lower half 1. As these upper and lower halves are formed symmetrically relative to each other, only lower half 1 is illustrated in FIG. 1 for explanation of the mold for forming waterproof cables.

The lower half 1 has a half part 5a of a first wire introducing opening 3a, and a half part 5b of a second wire introducing opening 3b at both ends thereof. The lower half 1 has a half part 9 of a cavity 7 for loosely receiving a plurality of wires. The cavity 7 is defined in a drum like shape and is enlarged at a portion 11 arranged substantially centrally in the wire insertion direction. The half part 9 of the cavity 7 is also formed correspondingly. The lower half 1 has an injection port 13, but the upper part of the mold has no injection port.

Figure 3:
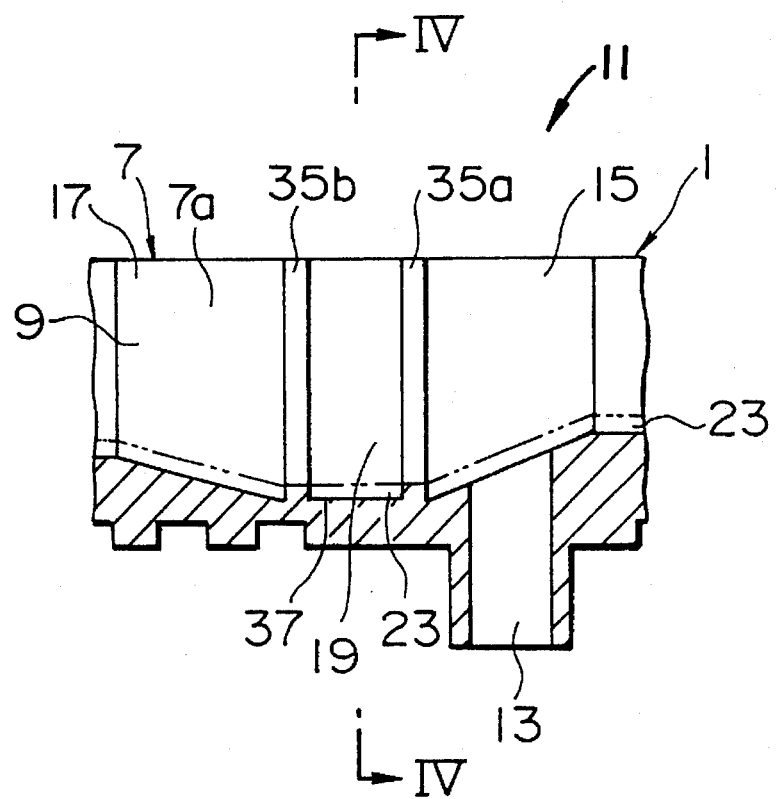
FIG. 3 is an enlarged sectional view of a portion III of FIG. 2.

FIG. 3 is an enlarged sectional view of the substantially central portion 11 of the lower half 1. As shown in FIG. 3, the half part 9 of the cavity 7 has tapered surfaces 15, 17 arranged along the wire insertion direction, and a parallel surface 19 arranged between the tapered surfaces 15, 17. It is noted that the upper half (not shown) of the mold also has a half part symmetrical to that of the half part 9, so that the cavity 7 is formed when the upper and lower halves mate with each other.

In one embodiment of the present invention, as shown in FIGS. 1 to 3, two ridges 35a, 35b are provided between the parallel surface 19 and each of the tapered surfaces 15, 17, respectively. These ridges 35a, 35b, therefore, are located at the substantially central portion 11 of the cavity 7, and extend perpendicularly to the wire insertion direction. Each of the ridges 35a, 35b has a rib shape such that the height measured from the inner wall surface 7a of the cavity 7 is substantially the same as the width in the wire insertion direction. The ridges 35a, 35b may be provided in the upper half, although it is not essential to provide them therein because the ridges 35a serve to support the wires against gravity. One, ridge, two ridges, or more than two ridges may be provided, if required. These ridges 35a, 35b can be provided not only in the direction perpendicular to the wire insertion direction, but also in a slightly inclined direction. Reference numerals 33a, 33b designate knock pins for positioning which are provided in the lower half 1 of the mold.

Figure 4:
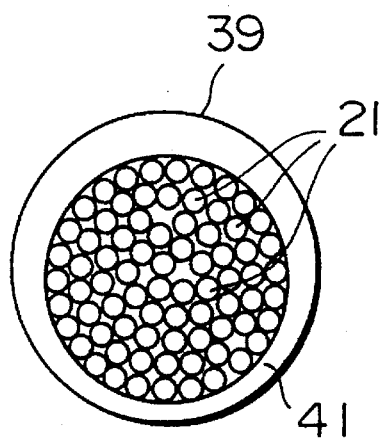
FIG. 4 is a sectional view along a line IV—IV of FIG. 3 showing a condition in which packing material is filled.
Figure 5:
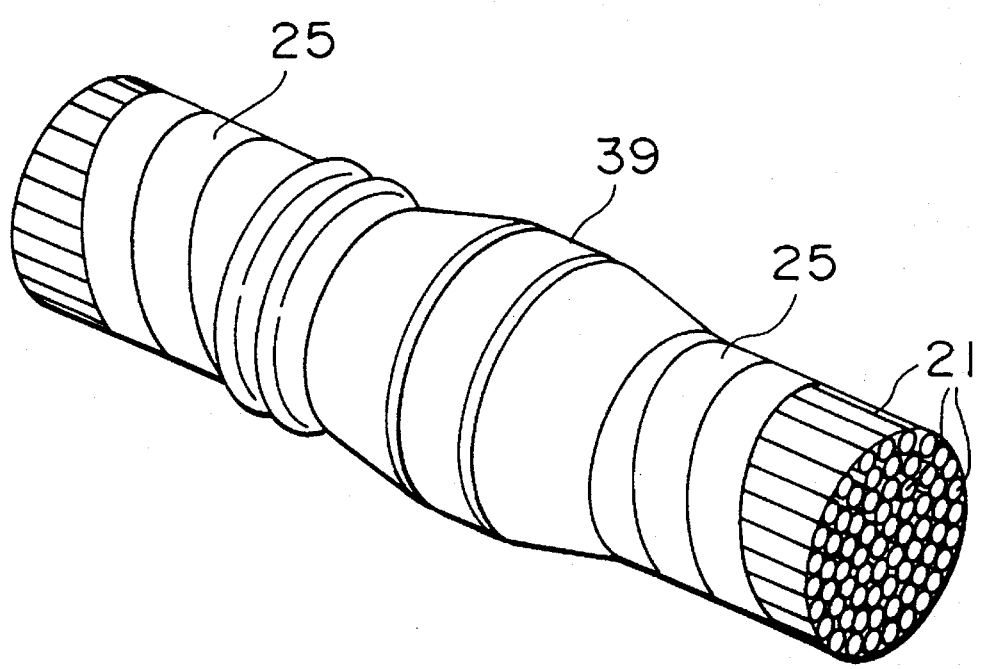
FIG. 5 is a perspective view of a finished product.

After mating the upper half with the above mentioned lower half 1, and introducing a plurality of electric wires therein, the packing material is filled through the injection port 13. During this operation, wires 21 (shown in FIGS. 4 and 5), received in the upper and lower halves, are supported on the ridges 35a, 35b, so that a large contact area is not established between the wires 21 and the parallel surface 19 of the central portion 11. In other words, a space 37 is formed between the wires 21 and the parallel surface 19, as shown in FIG. 3. Accordingly, the packing material 23 supplied through the injecting port 13 can be spread between the wires over the tapered surface 15, and reaches sufficiently to the space 37 or to a space facing the tapered surface 17. FIG.5 shows a waterproof cable formed in this way. A drum like portion 39 is formed at the central portion of the wire bundle. FIG. 4 shows a cross section of the molded water proof cable at a location along a line IV—IV in FIG. 3. As shown, a packed portion 41 corresponding to the space 37 is formed between the wires 21 and an outer surface thereof, so that the wires 21 are prevented from being exposed from the outer surface.

As shown in FIG. 5, the waterproof wire bundle formed in this way has a significantly improved reliability in waterproof characteristics since the wires 21 are not exposed largely from the hardened packing material 23.

Tape windings 25 prevent the wire bundle from being loosened.

What is claimed is:

1. A mold for forming waterproof cables, comprising a mold main body having a wire introduction opening at each end and a cavity defined by a space between said wire introduction openings;

said mold main body having an inner surface surrounding said cavity, and said wire introduction openings defining a direction of wire insertion of said cavity;

said cavity having a substantially central portion which includes a parallel surface and two tapered surfaces, one on each side of said parallel surface;

wherein said inner surface of said mold main body is discontinuous at boundaries between said parallel surface and respective ones of said two tapered surfaces to form a ridge between said parallel surface and each of said two tapered surfaces, respectively, each said ridge extending in a direction substantially transverse with respect to said direction of wire insertion.

2. The mold of claim 1, wherein each said ridge has a height measured from said inner surface and a width measured in said direction of wire insertion, said height and said width of each said ridge being equal.

3. The mold of claim 1, wherein each said ridge extends in a direction perpendicular to said direction of wire insertion.

4. The mold of claim 1, wherein each said ridge extends in a direction substantially inclined relative to said direction of wire insertion.

5. The mold of claim 1, wherein said substantially central portion of said cavity is enlarged.

6. The mold of claim 1, wherein said mold main body is discontinuous so as to form an injection port therein.

7. The mold of claim 6, wherein said injection port is formed in one of said two tapered surfaces.

8. The mold of claim 7, wherein said injection port is substantially centrally located within said one of said two tapered surfaces.

* * * * *